United States Patent [19]

Kreucher

[11] 4,215,962
[45] Aug. 5, 1980

[54] INTERNAL MILLING MACHINE FOR MILLING CRANK PINS

[75] Inventor: David L. Kreucher, Frankenmuth, Mich.

[73] Assignee: The Wickes Corporation, Saginaw, Mich.

[21] Appl. No.: 37,525

[22] Filed: May 9, 1979

Related U.S. Application Data

[62] Division of Ser. No. 883,809, Mar. 6, 1978, Pat. No. 4,171,654, which is a division of Ser. No. 764,067, Jan. 31, 1977, Pat. No. 4,099,431.

[51] Int. Cl.³ .............................................. B23C 3/08
[52] U.S. Cl. .................................. 409/241; 409/206; 409/221; 51/105 SP
[58] Field of Search ............... 82/9, 20; 409/241, 184, 409/189, 199, 204, 206, 221, 222, 223; 408/70, 71; 51/72 L, 105 SP, 98 SP, 165.8, 165.78; 74/815

[56] References Cited

U.S. PATENT DOCUMENTS

| 2,017,927 | 10/1935 | Steiner et al. | 51/105 SP X |
|---|---|---|---|
| 2,358,389 | 9/1944 | Ewart et al. | 74/815 |
| 2,565,787 | 8/1951 | Tennant | 409/222 |
| 2,633,777 | 4/1953 | Hoern | 409/221 X |
| 3,209,623 | 10/1965 | Schardt | 409/221 X |
| 3,336,823 | 8/1967 | Bonzi | 409/221 X |
| 3,878,651 | 4/1975 | Nakada et al. | 51/105 SP |

Primary Examiner—Gil Weidenfeld
Attorney, Agent, or Firm—Learman & McCulloch

[57] ABSTRACT

The machine of the present invention is an internal milling machine designed to mill the crank pins and crank arm cheeks of heavy crankshafts to precise dimensions. Positively locked clamping systems are employed to rigidly fix the headstock at indexed positions on the machine ways and to rotatively lock the chuck at rotatively indexed positions. Both clamping systems are capable of shifting the headstock and headstock chuck to a final precisely located indexed position as the locking members are moved into their locking relationship.

2 Claims, 22 Drawing Figures

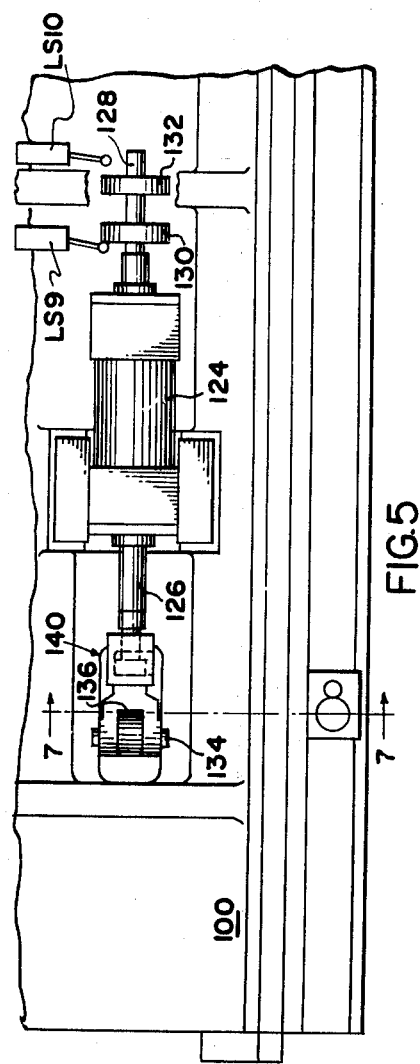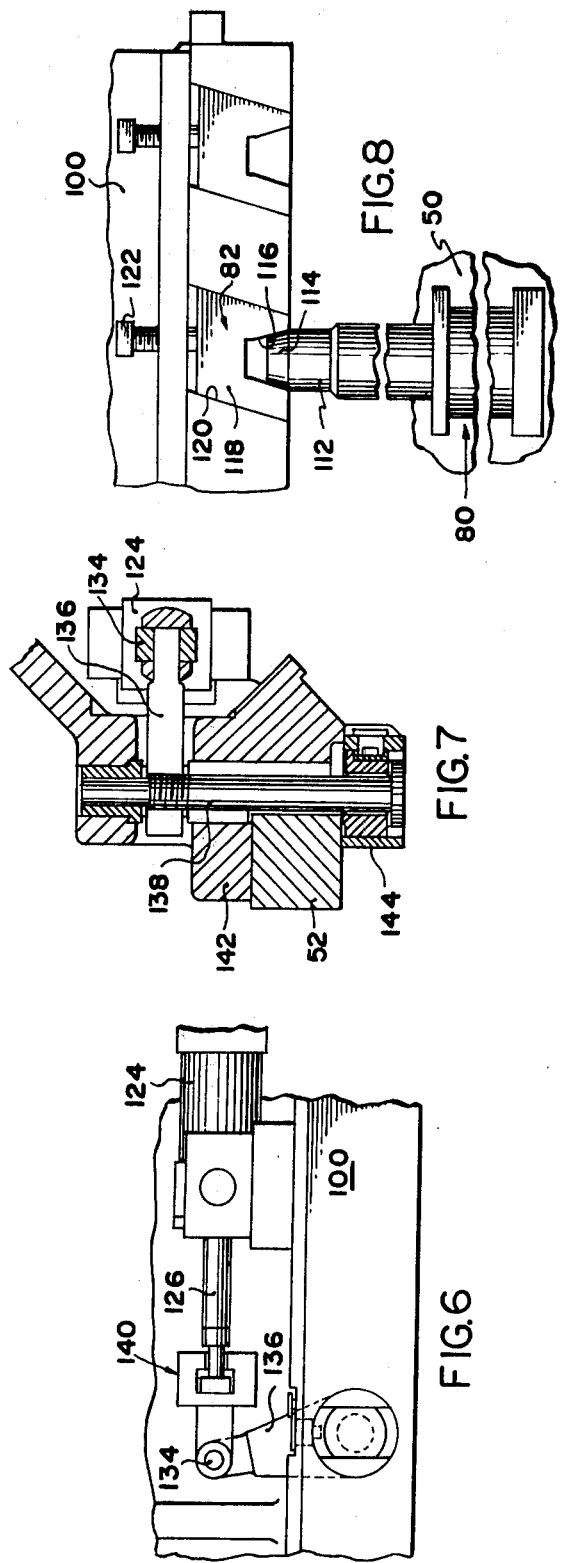

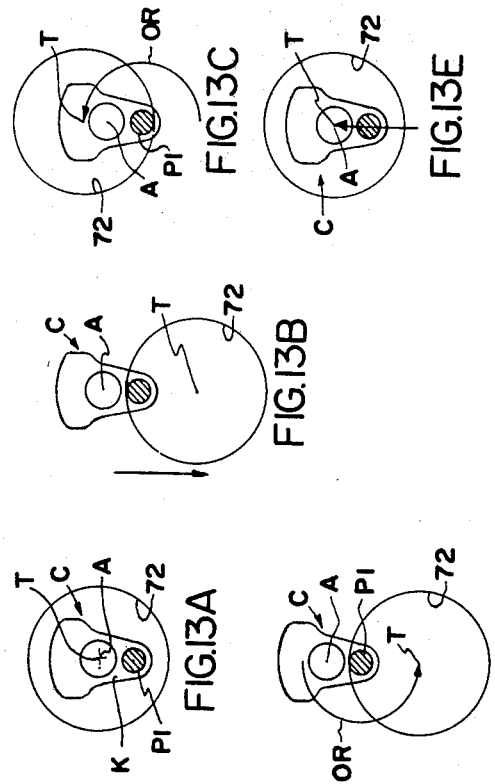
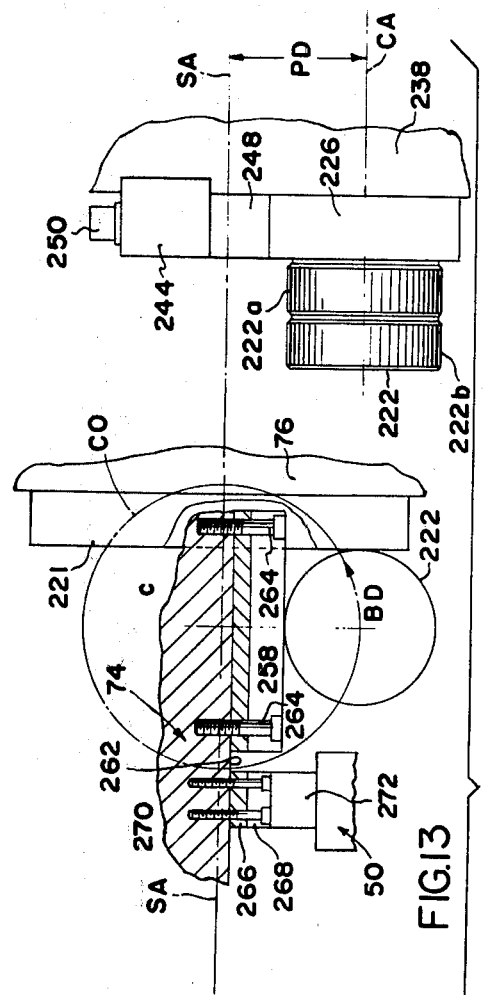
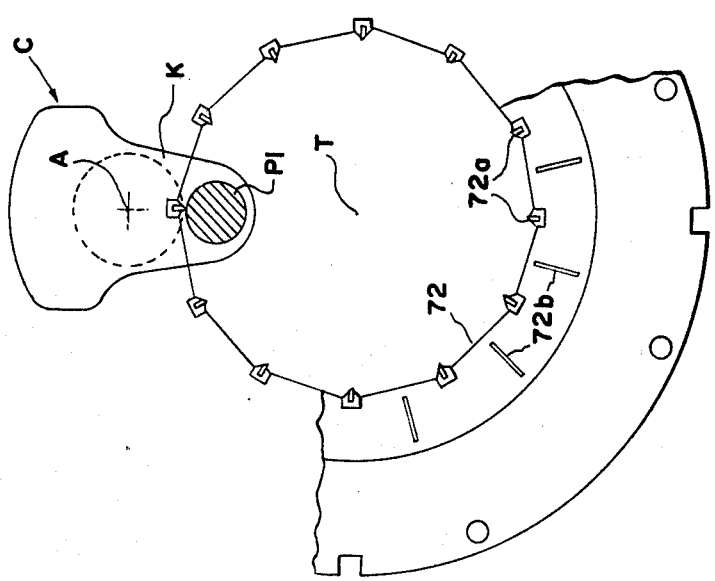

INTERNAL MILLING MACHINE FOR MILLING CRANK PINS

This is a division of application Ser. No. 883,809, filed in the United States Patent Office on Mar. 6, 1978, now U.S. Pat. No. 4,171,654 which is a division of application Ser. No. 764,067, filed Jan. 31, 1977, now U.S. Pat. No. 4,099,431, issued July 11, 1978.

BACKGROUND OF THE INVENTION

The machining of crankshafts is a complex operation due to the complex shape of the article and the degree of precision required. In recent years, machines for finishing crank pins by means of an internal milling cutter have been found advantageous for various reasons—see for example Kralowetz et al U.S. Pat. No. 3,880,025 and Berbalk U.S. Pat. No. 3,795,161. In these machines, the pin to be finished is positioned within the opening of an annular milling cutter having teeth on its inner periphery. The cutter is driven in rotation and is fed into milling relationship with the pin, and then driven in an orbital path around the pin to mill the pin surface to the desired final diameter. In this particular operation, by providing the cutter with teeth on its opposed axial side surfaces, the cheeks of the crank pin arms can likewise be milled as the cutter is fed toward and away from the pin.

In most prior art machines, the crankshaft is fixedly positioned relative to the machine frame between a pair of columns and the tool is shifted relative to the machine frame to successively machine or mill the individual pins. This arrangement possesses certain inconveniences in that the cutter and its supporting rotary drive and feeding mechanism, which must be shifted relative to the machine frame in moving from one pin to another, is extremely massive, and thus difficult to precisely position, and the feeding mechanism must be of a relatively complex nature because of the different angular positions of the individual crank pins about the main axis of the crankshaft.

Further, because the cutter must be able to move axially along the stationary crankshaft as it is shifted from pin to pin, the crankshaft normally can be supported only at its opposite ends during the milling operation so that the forces applied by the milling cutter to the crankshaft are frequently applied at a point which is at a substantial distance from the points of support of the crankshaft.

In the machine, which is shown and described in the present application, the milling cutter is mounted for operation in a general vertical plane which is fixed relative to the machine frame and the crankshaft is axially and rotatively indexed relative to the machine frame to successively advance the individual pins to a single machining position relative to the machine frame. With this arrangement, for crankshafts of given finished dimensions, the feeding and orbital motion of the internal milling cutter follows a single fixed path during each successive milling operation, and change-over of the machine, to operate on a new crankshaft of a different throw and/or pin diameter, can be readily accomplished simply by replacing a small number of gage blocks in the feed mechanism. Further, because the milling cutter operates in a fixed vertical plane, a clamping mechanism may be mounted at a fixed location on the machine frame near the plane of operation of the cutter to clampingly grip the main journal portion of the crankshaft which is adjacent to the pin at the machining location so that the crankshaft is rigidly supported during the machining operation by a point of support closely adjacent the location at which the cutting occurs.

SUMMARY OF THE INVENTION

In the machine of the present invention, an internal milling cutter is mounted for rotation within a cutter holder. The cutter holder is mounted for vertical movement relative to a cross slide which is in turn mounted for horizontal movement upon the machine frame. The cutter thus operates in a vertical general plane which is fixed relative to the machine frame, but can be shifted transversely and vertically within its general plane of operation. Orbital movement of the cutter in milling a crank pin to a selected diameter is accomplished by an orbiting cam roller which bears against a vertical surface on the cross slide and a horizontal surface on the cutter holder during the orbiting operation.

In one version of the invention a vertically disposed hydraulic motor connected between the cross slide and cutter holder supports a substantial portion of the weight of the cutter holder so that the cutter holder is gravitationally biased against the cam roller during the orbiting operation but with the major portion of its weight being supported by the hydraulic motor. This hydraulic motor is also employed to vertically shift the cutter holder to an indexing position where the cutter axis is coaxial with the main axis of a crankshaft so that the crankshaft may be axially indexed through the cutter.

The crankshaft to be milled is supported in chucks carried on a headstock/tail-stock unit mounted on the machine frame so that the longitudinal indexing of the headstock/tail-stock unit axially indexes the crankshaft relative to the milling cutter and rotation of the headstock chuck rotatively indexes the crankshaft. In a crank pin milling operation, the individual crank pins are successively located in a single fixed milling position relative to the machine frame by axially and rotatively indexing the crankshaft between successive pin milling operations. In order to assure precise location of the crank pins, both the axial and rotary indexing mechanism include positive acting lock mechanisms which, during movement into the locking position will axially and/or rotatively adjust the crankshaft precisely to the desired position. In the case of the rotary indexing mechanism, the locking member in the version of the invention illustrated takes the form of a wedge which is driven between a slide surface fixed on the head stock and a flat surface portion of a generally polygonal cam member which rotates with the chuck. Axial positioning of the crankshaft in the version of the invention illustrated includes the seating of a tapered shot pin in a complementarily tapered bore fixedly located upon the machine frame.

Because the cutter operates in a fixed vertical general plane, an auxiliary clamp may be mounted at a fixed position on the main ways of the machine to releasably clamp the crankshaft at a location adjacent the cutter during a milling operation to firmly mold and anchor the crankshaft in a fixed position while the milling operation is taking place.

Other features and objects of the invention will become apparent from the following detailed description taken in conjunction with the following drawings.

IN THE DRAWINGS

FIG. 5 is a partial top plan view of a headstock clamp assembly;

FIG. 6 is a detail side elevational view of a portion of the clamp assembly of FIG. 5;

FIG. 7 is a cross sectional view taken on the line 7—7 of FIG. 5;

FIG. 8 is a detail side elevational view of the headstock shot pin mechanism, with certain parts broken away or shown in section;

FIG. 13 is a schematic view illustrative the setting of the pin diameter and crankshaft throw dimensions in the cam mechanism;

FIGS. 13A-13E are schematic diagrams showing successive steps in the movement of the internal milling cutter during a pin milling operation;

GENERAL DESCRIPTION

Figure 1:
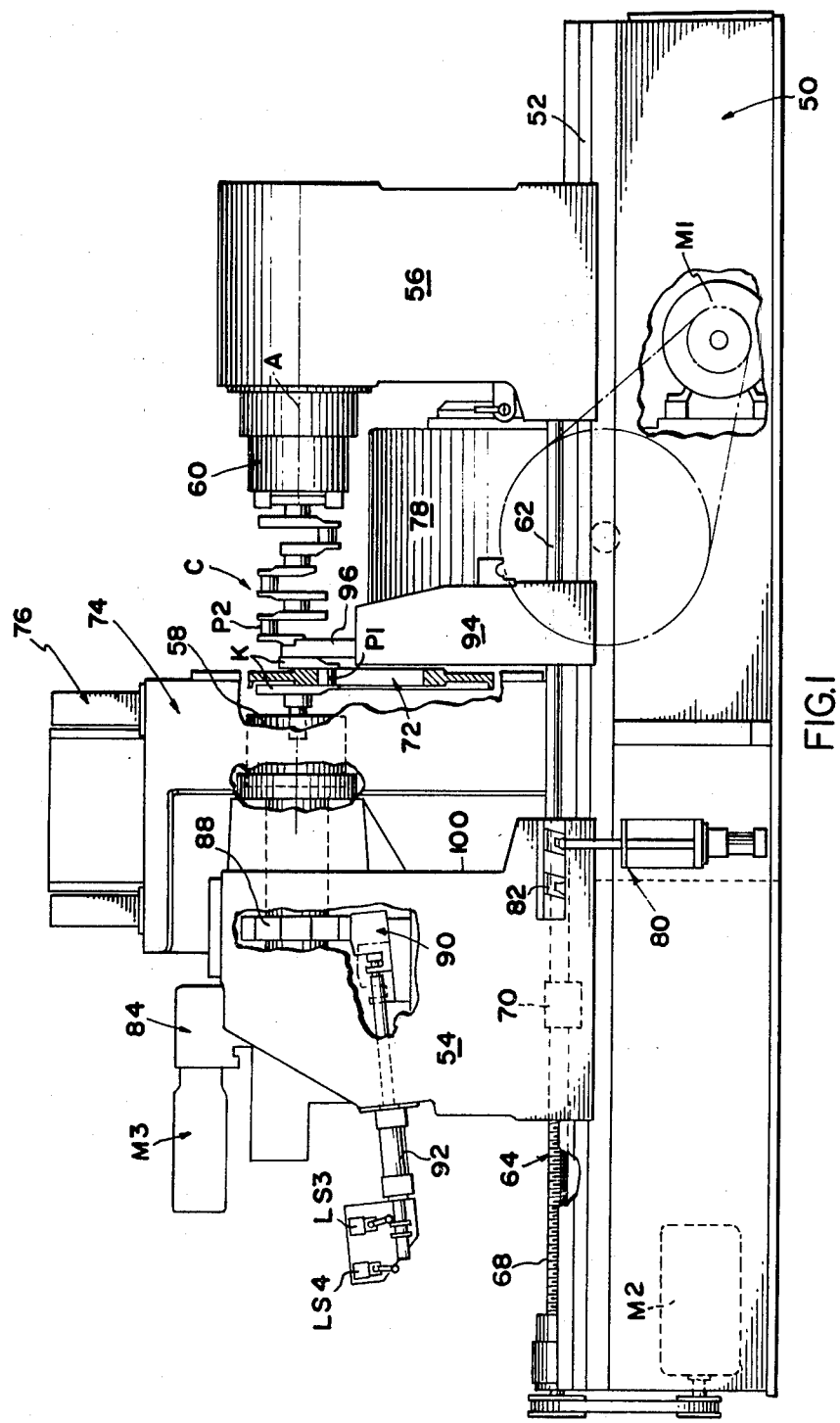
FIG. 1 is a side elevational view, with certain parts broken away, of a machine embodying the present invention.
Figure 2:
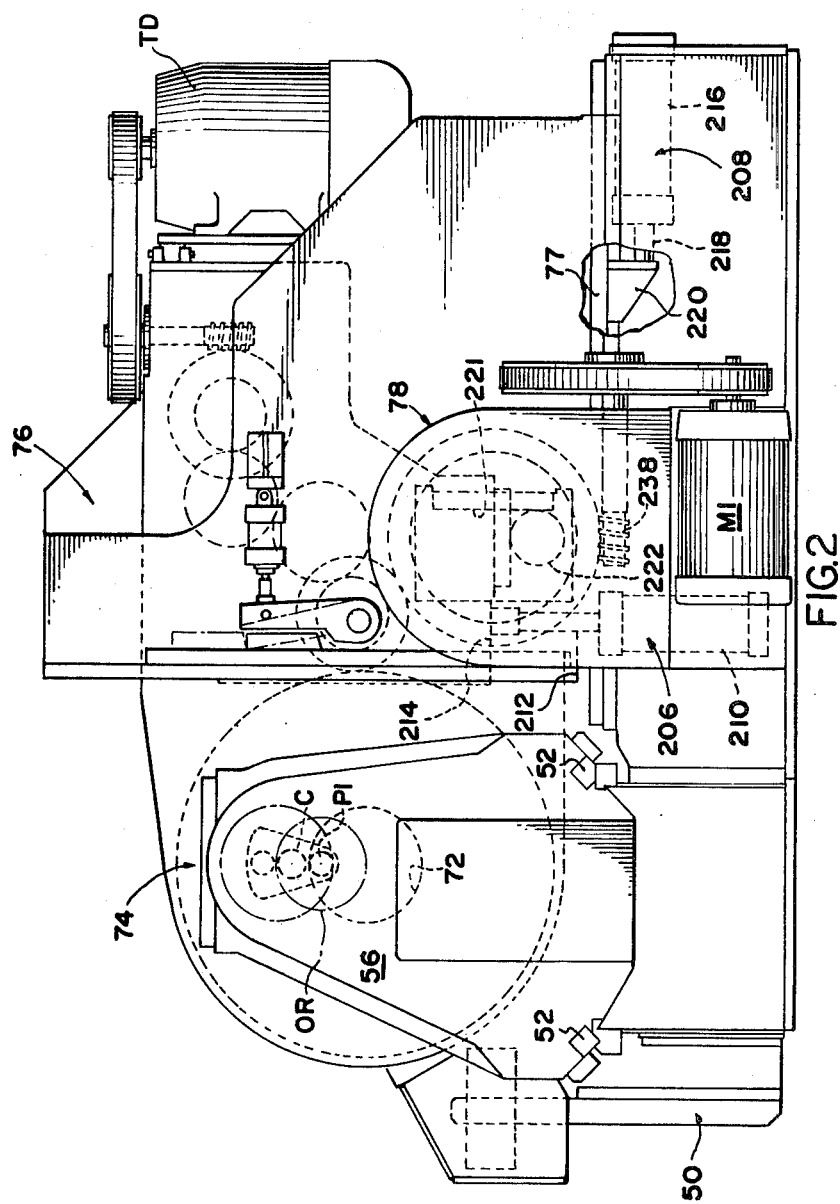
FIG. 2 is an end view, with certain parts broken away, of the machine of FIG. 1.

The major components of a machine embodying the present invention are shown in the overall views of FIGS. 1 and 2. Because of the size and complexity of various elements of the machine, many details do not appear in FIGS. 1 and 2 whose primary purpose is to show the overall relationship of the various elements with respect to one another.

The machine includes a stationary fixed frame designated generally 50 upon which are mounted a pair of spaced parallel longitudinally extensing ways 52 which support a headstock assembly 54 and a tail-stock assembly 56 for horizontal sliding indexing movement from left to right and vice versa as viewed in FIG. 1. The headstock 54 and tail-stock 56 are provided with chucks designated generally 58 and 60, respectively, which support between them the crankshaft C which is to be milled. The headstock and tail-stock are coupled to each other by a plurality of tie-rods such as 62, the axial spacing between headstock 54 and tail-stock 56 being fixed by the tie-rods 62 in accordance with the axial length of the crankshaft C being milled.

Because of the rigid interconnection between headstock 54 and tail-stock 56 via tie rods 62, headstock 54 and tail-stock 56 may be longitudinally indexed as a unit in horizontal movement upon ways 52. The indexing movement is accomplished by a ball screw connection designated generally 64 which is driven in rotation by a numerically controlled positioning device including a drive motor M2. The screw 68 of ball screw assembly 64 is rotatably journaled in the frame 50 and is operatively engaged with a nut 70 fixedly mounted on headstock 54. Thus, rotation of drive motor M2 drives the axially stationary screw 68 in rotation and this rotary movement is transmitted via nut 70 into longitudinal movement of headstock 54 which is in turn transmitted by tie-rods 62 to tail-stock 56. Thus, during indexing movement, the headstock 54, tail-stock 56, and the crankshaft C move as a unit from left to right or vice versa as viewed in FIG. 1.

An internal milling cutter designated generally 72 is mounted for rotation in a cutter holder designated generally 74. Cutter holder 74 is in turn mounted for vertical movement upon a cross slide 76 which carries the drive motor TD which drives cutter 72 in rotation via a suitable drive train. Cross slide 76 is in turn mounted upon a set of ways 77 (FIG. 2) which accommodate horizontal sliding movement of cross slide 76 from left to right and vice versa as viewed in FIG. 2.

During a milling operation upon crankshaft C, the crankshaft is held stationary and the milling cutter is shifted, by vertical movement of the cutter holder 74 and horizontal movement of cross slide 76 to perform the desired milling operations upon the stationary crankshaft. A normal sequence of operations commences with the crankshaft C positioned as shown in FIG. 1 with the pin P1 to be milled axially aligned with the vertical general plane of action of the annual internal milling cutter 72.

At the initial stage, tool holder 74 is at an elevated position compared with that shown in FIGS. 1 and 2 with the central axis of cutter 72 disposed in coaxial alignment with the main axis A of crankshaft C. The internal diameter of cutter 72 exceeds the maximum diameter of crankshaft C so that when holder 74 is in this last mentioned elevated position the crankshaft C can pass freely through the central opening in the cutter 72 during longitudinal movement of headstocks 54 and 56.

With the crankshaft, cutter holder 74, and cross slide 76 so positioned (with the cutter axis coaxial with the crankshaft axis A) the initial step in the milling sequence finds cutter holder 74 being vertically lowered in a "plunge" stroke to the position shown in FIG. 1, cutter 72 being driven in rotation by its drive motor TD during this lowering movement. As the rotating cutter 72 is thus lowered, it mills the cheeks or opposed faces of the arms K which couple the pin P1 to the main bearing portion of crankshaft C. The depth of this plunge stroke is regulated by a structure to be described below in accordance with the throw and pin diameter of the crankshaft. At the conclusion of the plunge stroke, (tool holder position as shown in FIG. 2) cutter 72 has milled the opposed faces of the arms K and likewise has milled the extreme top portion of the pin P1 to its final dimension.

At this time, the tool holder and cross slide are respectively driven in vertical and horizontal coordinated movement to cause the axis of the rotating milling cutter 72 to orbit in an orbital path OR (FIG. 2) about the axis of the pin PL with the cutter thus milling the surface of the pin to the desired diameter. This coordinated vertical and horizontal movement is accomplished by a rotating cam mechanism 78 which shifts the tool holder 74 and cross slide 76 in the necessary coordinated movement. This cam mechanism will be described in greater detail hereinafter.

At the conclusion of one orbital revolution of cutter 72 about pin P1, the outside diameter of the pin has been milled to the desired dimension. Tool holder 74 is then elevated and returned to its start position with the tool axis coaxial with the main axis A of the crankshaft.

When tool 72 is restored to its start position, an axial and a rotary indexing operation occurs to relocate the crankshaft relative to the frame so that the next pin P2 to be milled is shifted to occupy the position occupied by pin P1 in FIG. 1.

Longitudinal or axial indexing of the crankshaft is performed by actuation of indexing motor M2 which, via ball screw 68-70, axially shifts the headstock 54 and tail-stock 56 one step to the left as viewed in FIG. 1 to place pin P2 in alignment with the vertical plane of operation of the rotary tool 72. The longitudinal indexing of the headstock, tail-stock and chucked crankshaft is essentially a three-step operation, the numerical positioning control which controls motor M2 causing motor M2 to drive at a relatively high rate of speed until the headstock, tail-stock and crankshaft approach the next desired position. At this time, the rate of rotation of ball screw 68 is substantially decreased and finally stopped when the headstock is at the approximate desired position. Final precise positioning of the headstock is accomplished by a shot pin arrangement which includes a fluid pressure motor actuated shot pin designated generally 80 mounted on the frame and a shot pin receiving assembly 82 which is precisely positioned, by a structure to be described below, upon the headstock. Seating of the shot pin in its recess will slightly shift the headstock, as necessary, to an accurately adjusted position.

Rotary positioning of the crankshaft C is accomplished by a rotary indexing mechanism designated generally 84 which drives the headstock chuck 58 in rotary indexing movement to rotate the crankshaft C to shift pin P2 precisely to the rotary position occupied by pin P1 in FIG. 1. The rotary indexing mechanism includes a drive motor M3 controlled by a numerical positioning device which is coupled by a suitable drive mechanism to rotate chuck 58 and a flat surfaced cam 88—wedge 90 mechanism which precisely positions and positively rotatively locks chuck 58, and hence crankshaft C, at the desired rotated position. Cam 88 is essentially a generally polyginal cam member rotatively locked to the chuck rotating shaft. Wedge member 90 is driven by a hydraulic motor 92 into and out of wedging engagement between a flat inclined surface on the headstock frame and a flat surface on cam 88. This structure will be described in greater detail below.

With pin P2 now occupying the position of pin P1 in FIG. 1, the milling operation described above is repeated.

To assure accurate positioning of the crankshaft during the milling operation, an auxiliary clamp assembly designated generally 94 is mounted at a fixed position on ways 52. Auxiliary clamp 94 is releasably locked to the frame and carries a pair of opposed clamp arms 96 located to releasably grip the main bearing portion of crankshaft C immediately adjacent the pin being machined. This assures that the crankshaft is held steady during the milling operation.

HEADSTOCK ASSEMBLY

The headstock assembly 54 is best seen in FIGS. 3–8. Headstock 54 includes a rigid headstock frame 100 which is slidably supported upon ways 52 by slide members 102. Frame 100 is recessed as at 104 to provide passage for the indexing ball screw 68, nut 70 which is operably engaged with ball screw 68 being fixedly mounted at an appropriate location within recess 104. On the lower portion of headstock frame 100, three longitudinally extending tie-rods 106, 108 and 110 are fixedly coupled to the headstock frame, these tie-rods being employed to rigidly interconnect headstock 54 to tail-stock 58 so that the headstock and tail-stock move as a unit in fixedly spaced relationship to each other.

As described above, the headstock is driven in indexing movement along ways 52 when ball screw 68 is driven in rotation by indexing motor M2. While motor M2, which is controlled by a numerical positioning control system, will position headstock 54 at a selected location on ways 52 with a high degree of precision, the final positioning of the headstock upon the ways is accomplished by a shot pin arrangement best shown in FIG. 8. As previously described, a fluid pressure motor designated generally 80 is fixedly mounted upon the main frame 50 of the machine to drive its piston rod in vertical reciprocation. The piston rod of motor 80 carries a shot pin 112 having a frustoconical tapered end section 114 which is dimensioned to seat within a complementary bore 116 in the shot pin receiving assembly 82 which is mounted in headstock frame 100.

As best seen in FIG. 8, the assembly 82 includes generally trapezoidal-shaped block 118 which is received, with a drive fit, within a vertically inclined passage 120 formed in headstock frame 100. An adjustment screw 122 threadably received in frame 100 bears against the upper surface of block 118. By forcibly threading adjustment screw 122 into frame 100 to press downwardly against block 118, block 118 may be driven downwardly in passage 120. The vertical inclination of the passage wall will cause the block, and hence the centerline of bore 116, to be shifted from right to left as viewed in FIG. 8 as the screw 122 is threaded downwardly against the block. The inclination of passage walls 120 thus enables an extremely precise positioning of the centerline of opening 116 relative to the headstock frame 100. The frustoconical tapered shot pin 114 can thus enter bore 116 in the event the shot pin and bore centerlines are slightly misaligned and, as the shot pin is driven to its fully seated position, the pin will, if necessary, force the headstock to move until the shot pin and bore are in precise coaxial alignment. The shifting movement imparted to headstock 54 by the seating of shot pin 112 is normally very slight, because the numerical positioning control system which controls the ball screw drive of the headstock is in itself quite precise. However, it is extremely difficult to eliminate completely all lost motion in any mechanical drive system and the shot pin arrangement shown in FIG. 8 assures precise positioning of the headstock.

Because the crankshaft which is being milled is held stationary during the milling operation, the headstock, which supports the crankshaft, must be rigidly clamped in a stationary position during the milling operation. To provide an augmentation of the positioning provided by the shot pin assembly described above, two or more pair of clamp assemblies are mounted upon head stock frame 100 to clamp the headstock firmly in position upon ways 52 after the headstock has been precisely located by the actuation of the shot pin mechanism. Normally, two pairs of such clamp assemblies are employed, two associated with each of the pairs of ways 52 and located respectively adjacent the front and rear ends of the head stock. The clamp assemblies are of similar construction and the following description of one assembly is equally applicable to the others.

Referring to FIGS. 5-7, each clamp assembly includes a fluid pressure motor having a cylinder 124 fixedly mounted on frame 100. Piston rods 126, 128 project from opposite ends of cylinder 124, piston rod 126 being employed to actuate clamp structure to be described below, while piston rod 128 carries limit switch actuators 130 and 132 employed to actuate limit switches LS9 and LS10 (FIG. 5) to signal the location of piston rod 126 in its extended (LS9) or retracted (LS10) positions.

Piston rod 126 is pivotally interconnected as at 134 to an actuating arm 136 which threadably receives a clamping bolt 138 (FIG. 7) which is journaled for rotations within headstock frame 100. Preferably, a lost motion connection designated generally 140 (FIGS. 5 and 6) is provided between piston rod 126 and pivot 134 so that, on an unclamping stroke, piston rod 126 can be accelerated to the right as viewed in FIG. 6 for a short distance to achieve momentum and provide a hammer-like blow at the beginning of an unclamping action.

As best seen in FIG. 7, the headstock frame 100 includes a slide portion 142 in slidable engagement with way 52. Clamping bolt 138 carries a clamp member 144 which bears against the opposite side of way 52. As best seen in FIG. 7, when the actuating crank 136 is rotated by the extension or retraction of piston rod 126, the threaded connection between crank arm 136 and clamping bolt 138 will cause the bolt to shift axially within frame 100. When crank arm 136 is rotated in a direction drawing clamping bolt 138 upwardly, clamping block 144 is carried along with bolt 138 to firmly clamp way 52 between block 144 and the foot portion 142 of headstock frame 100. Actuation of the clamping motor in the opposite direction to retract piston rod 126 causes actuating arm 136 to rotate in the opposite direction to drive clamping bolt 138 downwardly as viewed in FIG. 11 to release the clamping grip.

Control of the shot pin actuating pin motors and the headstock clamping motors is performed by a control system to be described in more detail hereinafter.

The structure described above is employed to longitudinally position, and to longitudinally loc, headstock 54 relative to machine frame 50 to thereby position the crankshaft axially with respect to the milling cutter. Structure for rotatively positioning the crankshaft relative to the milling cutter is also carried by headstock 54 and is best shown in FIGS. 3 and 4.

Figure 3:
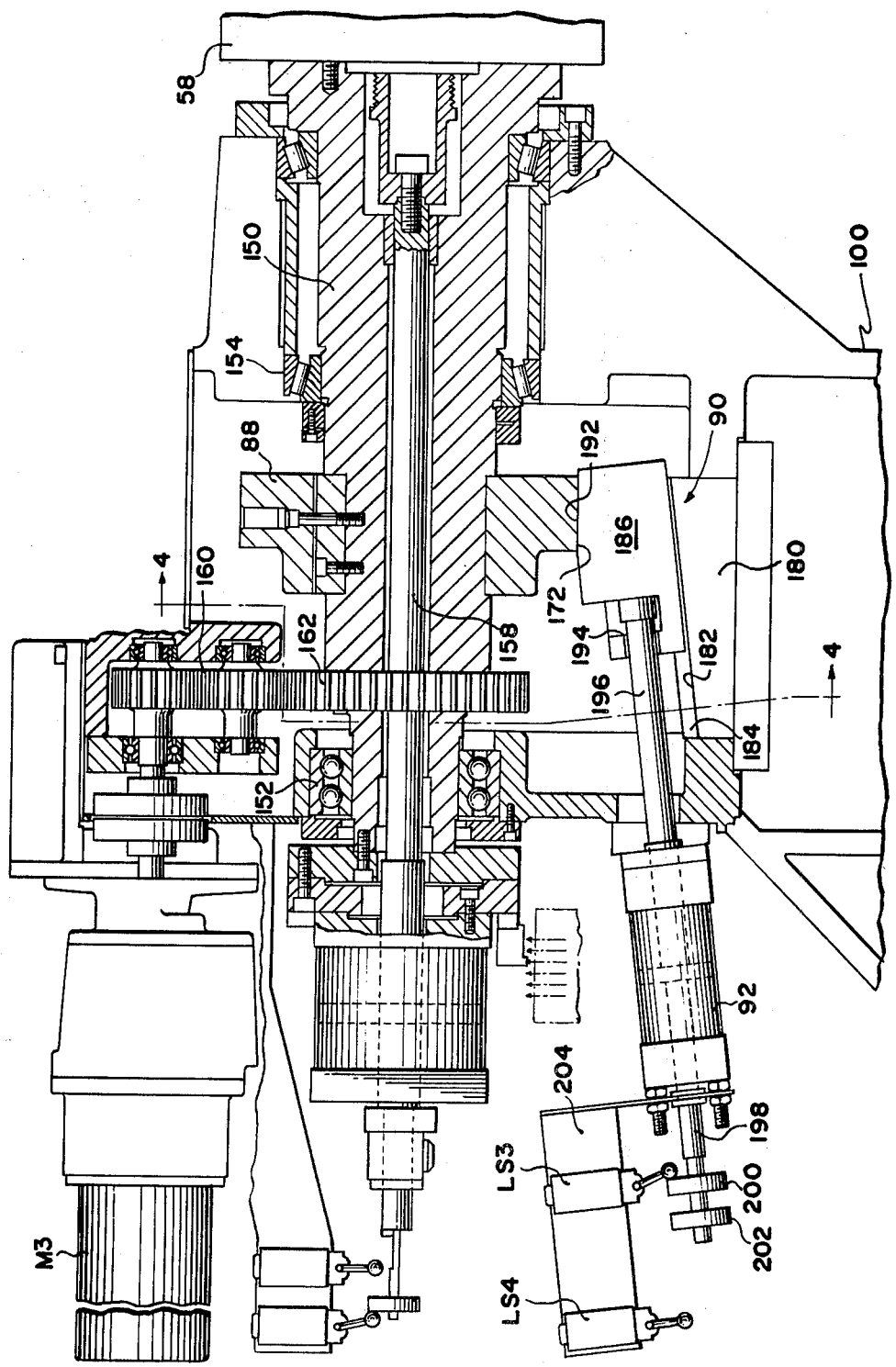
FIG. 3 is a side elevational view, with certain parts broken away or shown in cross section of the headstock chuck drive assembly of the machine of FIG. 1.

Referring first to FIG. 3, a main chuck spindle 150 is supported in headstock frame 100 for rotation within bearing assemblies 152, 154, 156. The axis of rotation of spindle 150 corresponds to the axis A of FIG. 1—that is the chuck 58, partially illustrated in FIG. 3, is mounted upon the right-hand end of spindle 150 as viewed in FIG. 3 to support a crankshaft C with its main axis coaxial with that of the axis of rotation of spindle 150. A central bore through spindle 150 provides a passage for mounting a chuck actuating shaft 158.

Spindle 150 may be driven in rotary indexing movement by actuation of drive motor M3 which is coupled through a suitable drive train designated generally 160 to a spur gear 162 fixedly mounted upon and rotatively locked to spindle 150. A generally polygonal cam member 88 is also fixedly secured to and rotatively locked to spindle 150. Cam member 150 is employed in conjunction with a wedge mechanism designated generally 90 to rotatively position and positively lock spindle 150 in selected positions of rotary adjustment.

Figure 4:
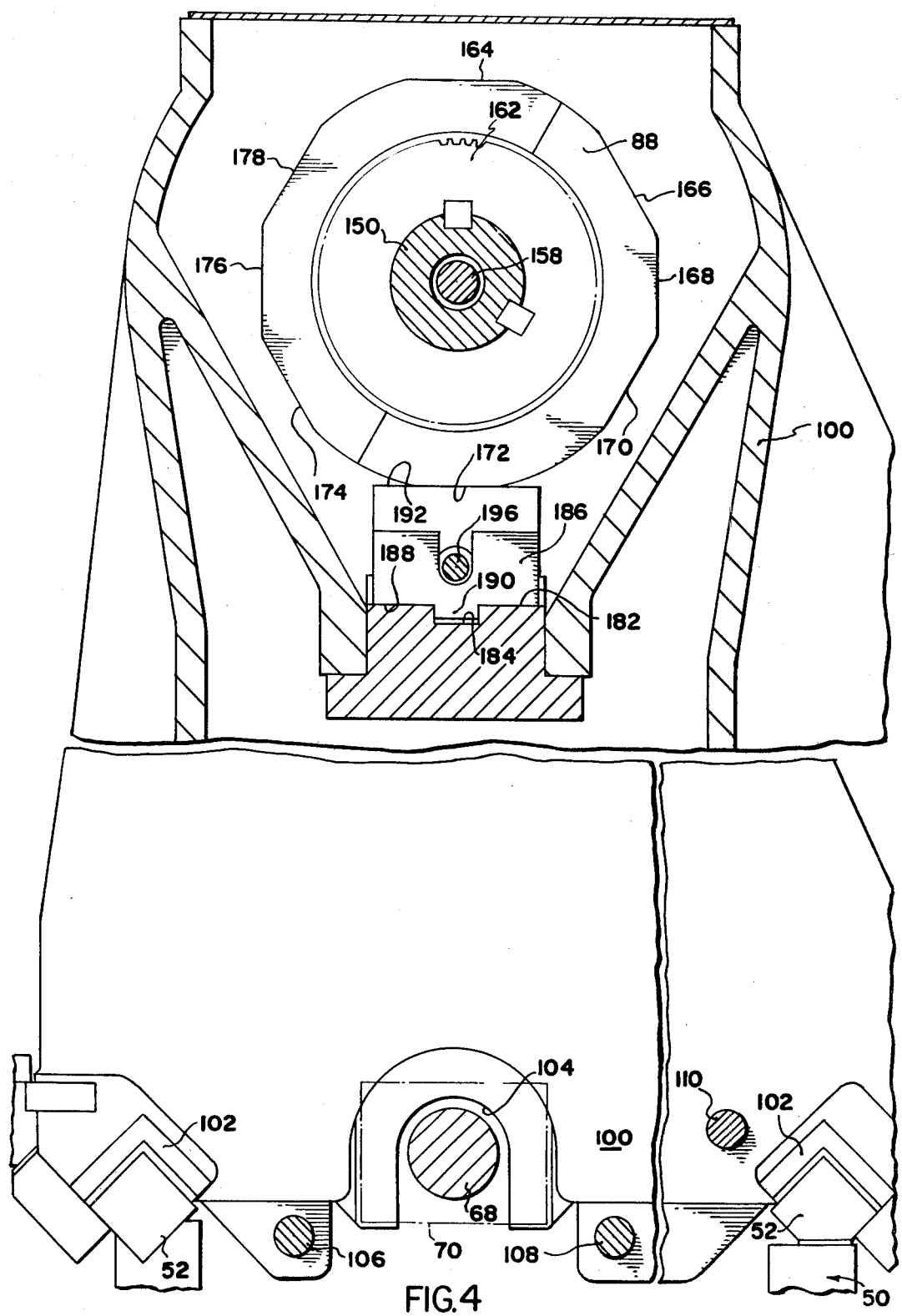
FIG. 4 is an end view, with certain parts broken away or shown in section of the chuck positioning cam.

Referring now particularly to FIG. 4, it is seen that the periphery of cam member 88 is provided with a plurality of flat peripheral surface sections 164, 166, 168, 170, 172, 174, 176 and 178. These flat surfaces are accurately located relative to one another about the axis of spindle 150 so that the spindle may be locked at any one of several rotative positions relative to the frame. The surfaces 164, etc. correspond respectively to the angular positions of the individual crank pins about the axis of the crankshaft. In the case of a four cylinder crankshaft with its pins rotatively located at zero, 90°, 180° and 270° about the main crankshaft axis, surfaces 164, 168, 172 and 176 would be employed to successively rotatively position the crankshaft with the successive pins in operative relationship with the milling cutter. In the case of a six cylinder crankshaft, with pins spaced at angular locations every 60° about the shaft, surfaces 164, 166, 170, 172, 174 and 178 would be employed in the rotative positioning of the six pin crankshaft.

As was the case with the longitudinal positioning of the headstock by the numerical positioning control system operating ball screw 68, motor M3 is employed, when spindle 150 is unlocked for rotation, to rotatively drive the spindle to the next desired angular position under the control of a numerically controlled positioning system. Final, precise positioning of spindle 150 is achieved by the cooperative interengagement between wedge mechanism 90 and one of the flat peripheral cam surfaces 164, etc.

Referring particularly to FIG. 3, the wedge mechanism 90 includes a slide block 180 fixedly mounted upon headstock frame 100. Slide block 180 is provided with an inclined slide surface 182 which lies in a general plane normal to a radial plane containing the axis of spindle 150 and inclined, as best seen in FIG. 3, relative to the axis of spindle 150. A guide slot 184 is preferably formed along the center of slide surface 182 to laterally guide a wedge block 186 whose flat lower surface 188 is located in sliding face-to-face engagement with slide surface 182. A projecting tongue 190 on the lower surface of wedge block 186 is slidably received within a slot 184 of slide block 180 to guide wedge block 186 in movement relative to slide block 180.

The upper surface 192 of wedge block 186 lies in a horizontal plane normal to the radial plane containing the axis of spindle 150.

As best seen in FIG. 3, wedge block 186 is connected by means of a lost motion coupling 194 to the piston rod 196 of wedge actuating motor 92. In FIG. 3, wedge block 186 is illustrated in its seated chuck locking position in which the opposed surfaces 188 and 192 of the wedge block are forcibly wedged between slide surface 182 of the slide block and a flat peripheral surface such as 172 of cam 88. Upon actuation of motor 92 to retract its piston rod 196, slide block 186 is withdrawn to the left as viewed in FIG. 4 to disengage its surface 192 from cam 88 to permit cam 88 and spindle 150 to be rotated to a new angular position.

Because of the angular relationship between slide block surface 182 and surfaces 188 and 192 of slide block 186, it is seen that as wedge block 186 is driven to the right as viewed in FIG. 3, its cam engaging surface 192 moves vertically upwardly to engage a flat peripheral surface of cam 88. If spindle 150 and its rotatively locked cam 88 are not precisely in the desired rotation alignment, the upwardly moving surface 192 of wedge block 186 will strike the lowermost portion of the flat cam surface to rotate the cam, and hence the spindle into the desired rotative position as wedge block 186 is driven to its locking position shown in full line in FIG. 3. When wedge block 186 is firmly seated, as viewed in FIG. 3, the engagement between the flat surface 192 of the wedge block and a cam surface, such as 172 (FIG. 4) provides a position lock prohibiting any rotary movement of cam 88 and hence spindle 150.

A second piston rod 198 projects from the opposite end of the cylinder of motor 92 and carries a pair of limit switch actuating members 200, 202 which are employed to actuate limit switches LS3 and LS4 carried on a bracket 204 mounted on motor 92. The striker of limit switch LS3 is actuated, as shown in FIG. 3, to indicate the location of wedge block 186 in a rotation locking position, while member 202 engages and actuates the striker of limit switch LS4 to signal the arrival of wedge block 186 at its fully retracted position.

CUTTER HOLDER DRIVE

The movement of cutter holder 74 during a milling cycle is accomplished by cam mechanism 78, details of which are best shown in FIGS. 9–13, combined with a pair of hydraulic motors designated generally 206 and 208 (FIG. 2).

Figure 9:
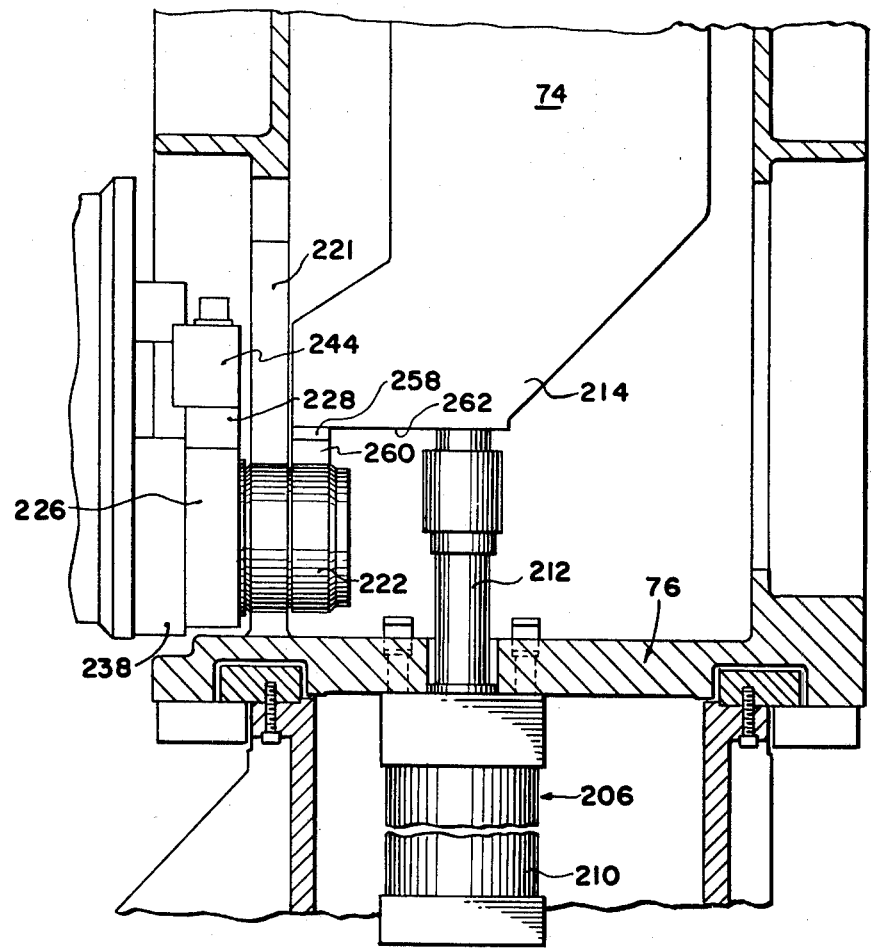
FIG. 9 is a detail side elevational view, with certain parts broken away or shown in section, of the tool positioning cam mechanism.

Referring briefly to FIGS. 2 and 9, motor 206 has its cylinder 210 fixedly mounted on cross slide 76 with cylinder 210 extending in a vertical direction. The piston rod 212 of motor 206 is coupled to a projection 214 of cutter holder 74 so that extension and retraction of the piston rod 212 can drive cutter holder 78 in vertical movement relative to cross slide 76. Motor 206 performs both a vertical positioning function in driving cutter holder 74 vertically betwen its ready position (FIG. 13A) in the downward plunge stroke to the position shown in FIG. 13B and for subsequently vertically elevating cutter holder 74 from the position at the conclusion of the pin milling operation in FIG. 13D back to the ready position of FIG. 13E. Motor 206 further is employed to support the major portion of the weight of cutter holder 74 during the orbital movement of the tool around a pin being milled.

Motor 208 is mounted (FIG. 2) in a horizontal position with its cylinder 216 fixedly mounted on machine frame 50 and its piston rod 218 coupled to a bracket 220 fixedly mounted on cross slide 76. Motor 208 performs a biasing action continuously urging cross slide 76 to the left as viewed in FIG. 2 so that a vertical follower slide 221 fixedly mounted on cross slide 76 is held in bearing engagement with a cam roller 222 for purposes to be described below.

Figure 10:
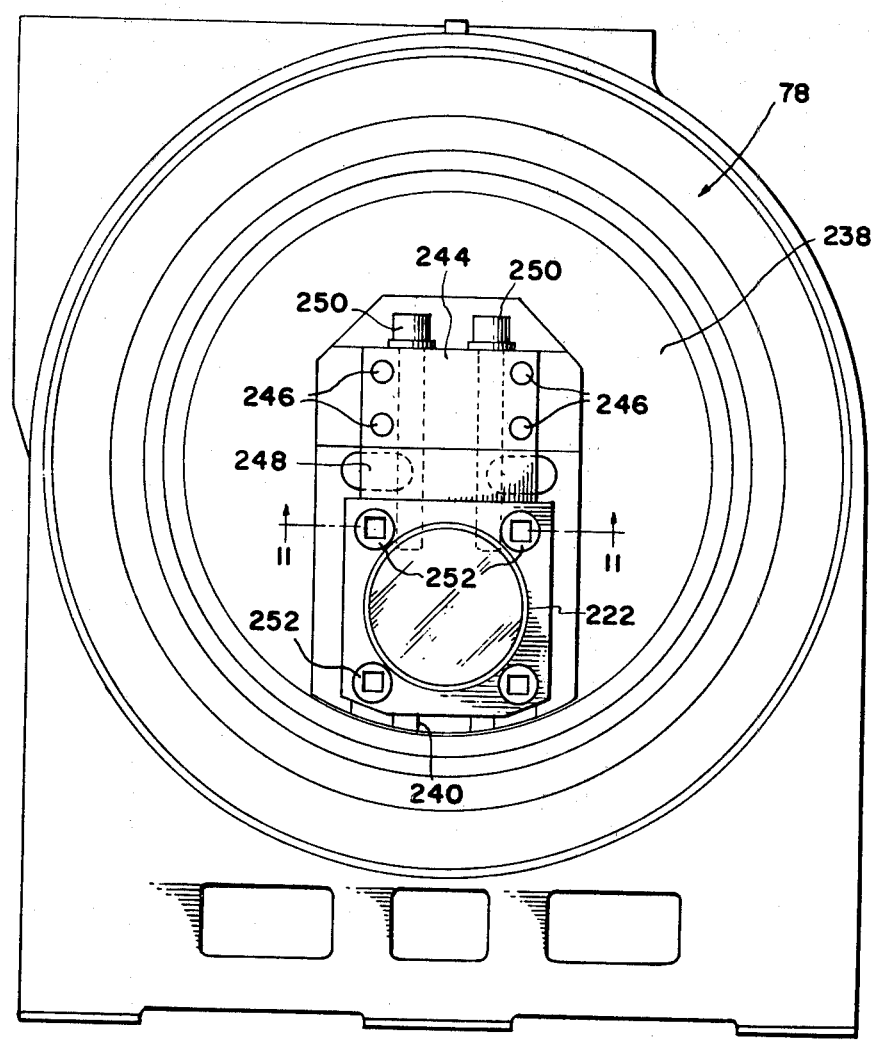
FIG. 10 is an end view of the cam mechanism shown in FIG. 9.
Figure 11:
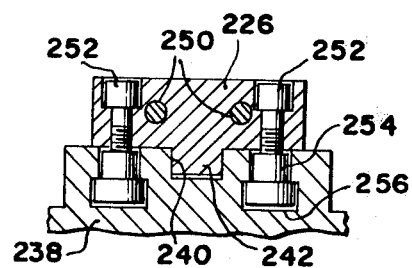
FIG. 11 is a cross sectional view taken on the line 11—11 of FIG. 10.
Figure 12:
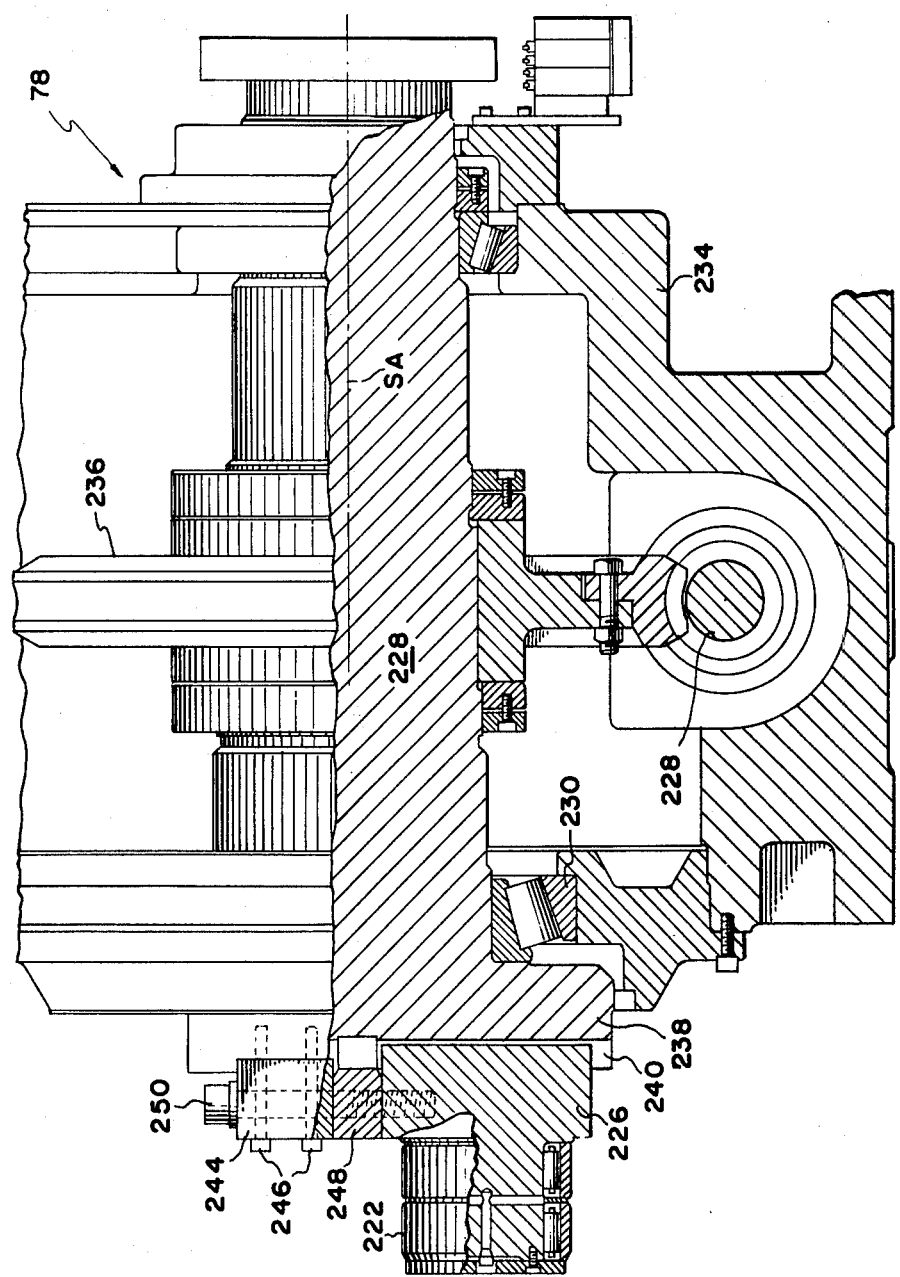
FIG. 12 is a side elevational view, with certain parts broken away or shown in section, of the cam mechanism.

The major details of cam mechanism 78 are best shown in FIGS. 9–12. Referring first to FIG. 12, it is seen that cam roller 222 is a double bearing assembly rotatably mounted upon a stub shaft 224 which projects from a mounting block 226. Mounting block 226 is in turn mounted upon a main drive shaft 228 by structure to be described in greater detail hereinafter. As best seen in FIG. 12, shaft 228 is supported for rotation in a cam drive frame 234 as by bearings 230 and 232. A worm wheel 236 fixedly mounted upon shaft 228 is driven by a worm 238 which in turn is driven by cam drive motor M1 via a suitable gear drive train.

Referring now particularly to FIGS. 10–12, it is seen that main shaft 228 is formed with a circular face plate portion 238 having a radially extending groove 240 which slidably receives a tongue portion 242 of block 226 (FIG. 11) to slidably guide mounting block 226 in movement radially of the exposed front surface of face plate 238. A locating block 244 is fixedly mounted on face plate 238 as by bolts 246 (FIG. 12) to provide a fixed reference surface from which mounting block 226 can be radially located on face plate 238. To locate mounting block 226 accurately at a selected radial position on face blade 238, a gage block 248 of precisely machined thickness is located between locating block 244 and mounting block 226 as best seen in FIGS. 10 and 12, and bolts 250, which pass freely through locating block 244 and gage block 248 and are threadably received in mounting block 226, are employed to firmly draw mounting block 226 against the gage block which is in turn firmly seated against locating block 244. When mounting block 226 has been so positioned, four clamping bolts 252 received in mounting block 226 are tightened (see FIGS. 10 and 11) to firmly clamp mounting block 226 to face plate 238 by means of nuts 254 slidably received within T-slots 256 in face plate 238.

The radial distance by which the axis of rotation CA of cam rollers 222 is offset from the axis of rotation of main shaft 228 determines the throw to which the crankshaft pin is milled by the orbital motion of milling cutter 72. Upon rotation of shaft 228, cam roller 222 is driven in a circular orbit about the axis SA of main shaft 228. This orbital motion of cam roller 222 is converted into horizontal movement of cross slide 76 (follower 221 contacts cam portion 222a) and vertical movement of cutter holder 74 (follower 258 contacts cam portion 222b) so that the axis of rotation of cutter 72 is driven in a similar orbital path about the axis of the pin being milled. The two cam portions 222a and 222b can rotate freely independently of each other upon stub shaft 224 as is required by the fact that the rate of rotation of the portions 222a and 222b, or the rate at which they roll across the respective follower surfaces, varies during rotation of shaft 228.

Referring now to FIG. 13, which shows a schematic diagram of the adjustment and operation of cam rollers 222, at the lower right-hand corner of this figure a combination side elevation-cross sectional view shows how gage block 248 is employed to accurately space the cam roller axis CA from the axis SA of main shaft 228 by a distance PD to establish the pin throw setting.

Referring now to the lower central portion of FIG. 13, it is seen that cross slide 76 is provided with slide follower plate 221 which bears against the surface 222a of cam roller 222. As explained above, motor 208 exerts a predetermined biasing force on cross slide 76 to maintain slide follower 221 in contact with roller 222.

A second slide follower 258 is fixedly secured to a horizontal surface of cutter holder 74 and is accurately located with respect to this surface by a second gage block 260 clamped between slide follower 258 and the horizontal surface 262 on cutter holder 74 as by bolts 264. Slide follower 258 is gravitationally maintained in contact with the surface 222b of cam roller 222, although as explained above, motor 206 is employed to support a major portion of the weight of the tool holder so that the entire weight of the tool holder does not have to be supported upon cam roller 222.

A third gage block 266 is clamped between a foot block 268 and horizontal surface 262 of cutter holder 74 as by bolts 270. Foot block 268 serves as a locater engageable with a fixed stop block 272 fixedly mounted upon cross slide 76 to establish a lower limit of movement of cutter holder 74, and hence cutter 72 reltive to the frame. Although the thickness of gage blocks 260 and 266 appear substantially the same in FIG. 13, normally these thicknesses will differ. Gage block 266 defines a lower limit to the plunge stroke of cutter holder 74 and thus is a dimension determined by the pin diameter of the crankshaft.

The thickness of gage block 260 is selected so that when foot member 268 rests on stop 272 as shown in FIG. 13 and cam roller 222 is at its lower dead center position with respect to the axis of its main shaft 228, slide member 258 is in contact with cam roller 222 as illustrated. With the cutter holder 74 in the position illustrated in the lower central portion of FIG. 13, cutter 72 is at the position shown at the left-hand portion of FIG. 13 with the cutter in milling contact with the top dead center portion of the pin P1 being milled.

FIGS. 13A–E show, in schematic fashion, the movement of internal milling cutter 72 during a milling cycle, the holder being shifted at various points during the cycle by motor 206 and by the orbital motion of cam roller 222 as transmitted to cross slide 76 and cutter holder 74 via slide followers 221 and 258, respectively.

Referring first to FIG. 13A, this particular figure shows the milling cutter 72 in its upper or indexing position relative to the chuck crankshaft C which remains stationary during each milling cycle. In FIG. 13A, it will be noted that the axis of rotation of the internal milling cutter indicated at T is in coaxial relationship with the main axis A of crankshaft C. As indicated in this figure, the internal diameter of cutter 72 exceeds the maximum diameter of crankshaft C so that the crankshaft may be axially indexed through the cutter opening when the cutter is positioned as shown in FIG. 13A. The pin to be milled in the illustrated cycle is designated at P1.

In FIG. 13A, cam roller 222 is in its lower dead center position with respect to the axis SA of its main shaft 228. With the internal milling cutter 72 in the position shown in FIG. 13A, the cutter holder 74 would be elevated from the position shown in FIG. 13 by a distance corresponding to the spacing between the cam shaft axis A and the cutter axis T in the left-hand portion of FIG. 13. Cross slide 76 would be in the position shown in the central portion of FIG. 13.

The first step of the milling cycle finds cutter holder 74 being lowered (by actuation of motor 206) from the position shown in FIG. 13A to the position shown in FIG. 13B in a so-called plunge stroke. During this motion, the cutter is of course rotating about its axis continuously and during the plunge stroke the cutter mills the opposed cheeks of the crankshaft arms K which support the pin P1. At the conclusion of the plunge stroke, the cutter 72 and cutter holder 74 are in the position shown in FIGS. 13 and 13B, at which time the rotating cutter has milled the top dead center portion of pin P1 to the desired dimension.

At the conclusion of the plunge stroke, the cam drive motor M1 is energized to drive shaft 228 of cam mechanism in rotation about the shaft axis SA. Assuming this direction of rotation is counterclockwise as viewed in FIG. 13, cam roller 222 is carried along the circular path CO indicted in FIG. 13. In FIG. 13C the cam roller 222 has been carried in a counterclockwise direction from the six o'clock position shown in FIG. 13B to the twelve o'clock position shown in FIG. 13C. During this motion of the cam roller 222, cross slide 76 is driven to the right as cam roller 222 moves from the six o'clock position to the three o'clock position and is then driven back to the left as viewed in FIG. 13 as the cam roller travels from the three o'clock position to the twelve o'clock position, motor 208 forcing cross slide 76 to follow the retracting cam roller. Throughout the movement of cam roller 222 from the six o'clock position of FIG. 13, 13B to the twelve o'clock position of FIG. 13C, cutter holder 74 is driven upwardly. The coordinated movement of the cross slide and cutter holder occasioned by the described movement of cam roller 222 causes the axis T of the rotating cutter to orbit along the path OR about the axis of the pin P1 being milled, the cutter remaining in milling relationship with the peripheral surface of the pin throughout this motion to successively mill to final dimensions the peripheral portion of pin P1 lying to the left of its central axis as viewed in FIGS. 13 and 13A–E.

From the position shown in FIG. 13C, rotation of the cam carrying shaft continues, as indicated in FIG. 13D until cam roller 222 has completed one revolution about the axis SA of its shaft. At this time, the various parts are returned to the position shown in FIG. 13B and one orbital milling path of the cutter has been completed about pin P1. Rotation of the cam carrying shaft is halted as it completes one revolution and motor 206 is then actuated to elevate cutter holder 74 (FIG. 13E) until cutter 72 has been returned into coaxial alignment with the axis A of the crankshaft to permit indexing of the crankshaft to bring a new pin into operative alignment with the cutter.

It is believed apparent from the foregoing description that by suitable selection of gage blocks 248, 260 and 266, the cam mechanism may be rapidly and readily adjusted to accommodate any particular pin diameter and crankshaft throw dimension combination within the range of capability of the machine.

AUXILIARY CLAMP

Figure 15:
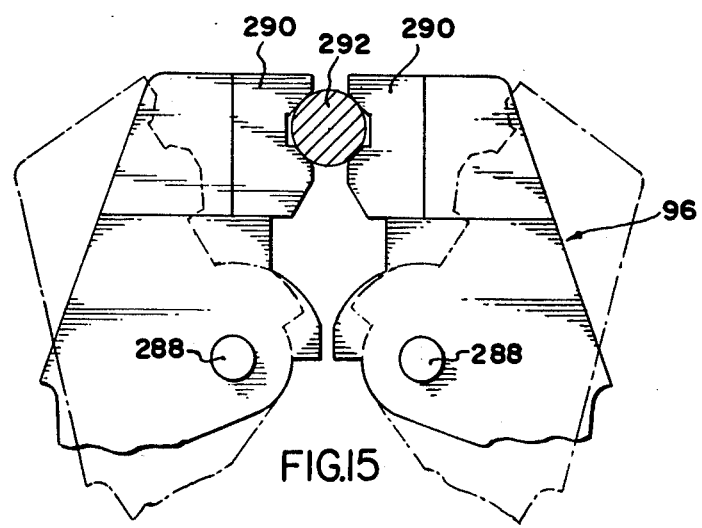
FIG. 15 is a detail end view of a portion of the auxiliary clamp mechanism.
Figure 14:
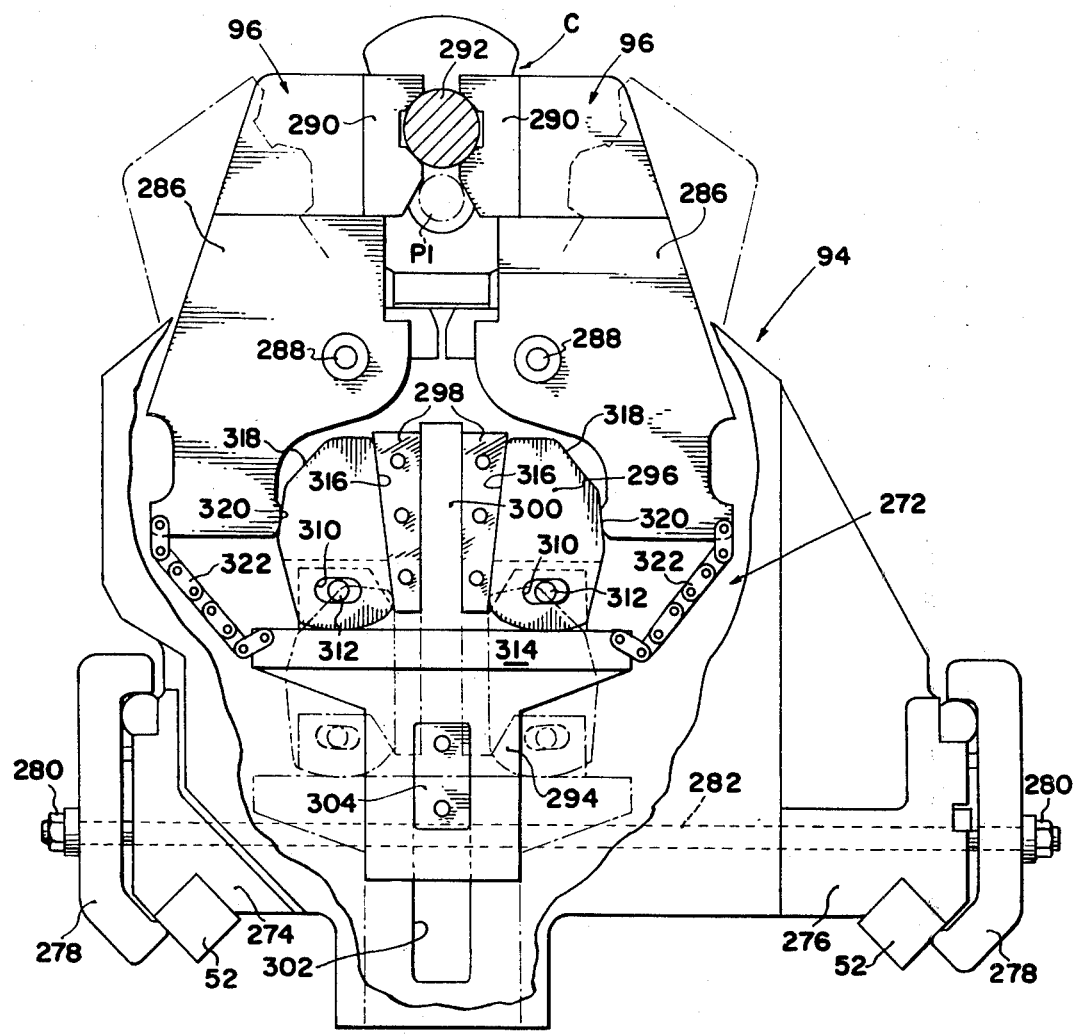
FIG. 14 is an end elevational view, with certain parts omitted, of the auxiliary clamp mechanism.
Figures 16, 17:
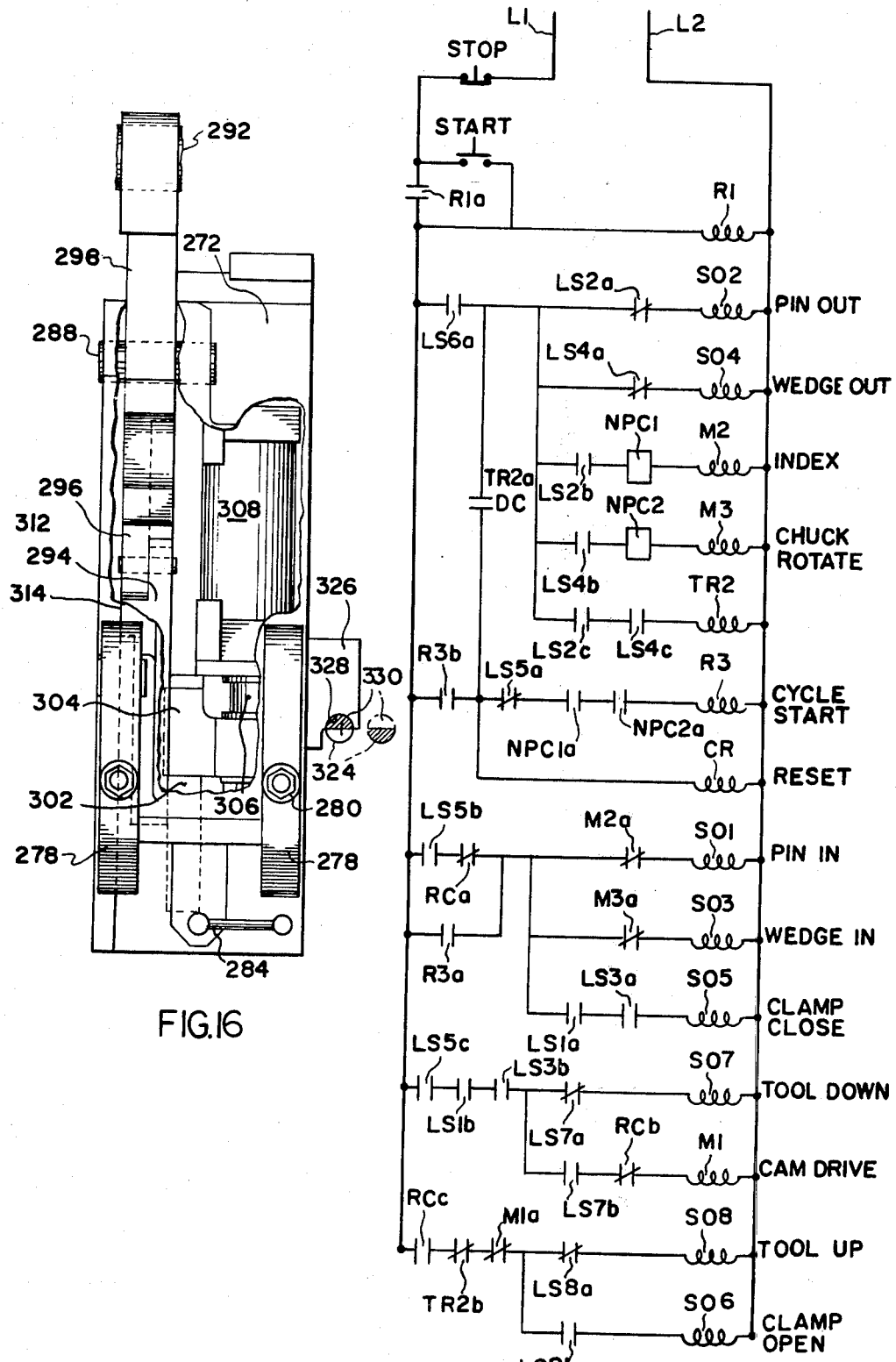
FIG. 16 is a side elevational view of the auxiliary clamp mechanism, with certain parts broken away.
FIG. 17 is a schematic diagram of an exemplary form of electrical control systems for the machine.

Details of auxiliary clamp 94 are best seen in FIGS. 14–16.

Referring first to FIG. 14, which shows the clamp 94 with the side plate closest to the observed removed, clamp assembly 94 includes a fixed frame designated generally 272 which is mounted as by slides 274, 276 for sliding movement upon the main ways 52 of the machine. Clamp 94 is locked in a fixed position on ways 52 by four clamp members 278 which are drawn into clamping engagement with ways 52 by nuts 280 threadably received upon the opposite ends of a clamping rod 282 which extends transversely between opposed pairs of clamp members 278. Prior to clamping the clamp assembly 94 in position upon the ways, clamp 94 is accurately located on the ways by the manual seating of a shot pin assembly, partially shown at 284 in FIG. 17 which projects a shot pin carried on assembly 94 into a shot pin receiving bore, not shown but of construction similar to assembly 82, on main frame 50. The auxiliary clamp 94 is located in a fixed position relative to the general plane of operation of the internal milling cutter so that the operative members, designated generally 96, of auxiliary clamp 94 can clampingly grip a main bearing section of the crankshaft C which is adjacent to the crank pin P being milled (see FIG. 1).

Referring now particularly to FIG. 14, clamp members 96 take the form of arm-like elements 286 which are pivotally mounted upon clamp frame 272 by pivot pins 288. Arms 286 each are provided with a detachable clamping jaw insert 290 fixedly secured to arms 286 as by bolts, not shown, so that the jaws may be replaced as necessary to be matched to the dimensions of the crankshaft C being handled by the machine.

In FIG. 14, the clamp assembly is shown in its closed position with a main bearing section 292 of the crankshaft C clampingly gripped between the opposed jaw inserts 290 of the arm assembly 96.

Clamp members 96 are shifted between the clamping position shown in full line in FIG. 14 and the released position indicated in broken line in FIG. 14 (see also FIG. 15) by mechanism which includes a yoke 294, a pair of wedge members 296 loosely mounted for pivotal movement on yoke 294 and a pair of inclined wedge blocks 298 which are fixedly bolted in position upon clamp frame 272. Yoke 294 is mounted upon frame 272 for vertical sliding movement as viewed in FIG. 14, the yoke being guided in part by an upwardly projecting tongue portion 300 slidably received between wedge blocks 298 and by a vertical slot 302 in frame 272. A coupling bracket 304 is fixedly secured to yoke 294 and projects rearwardly through slot 302 to perform the dual function of slidably guiding yokr 294 within slot 302 and to couple yoke 294 to the piston rod 306 (FIG. 16) of a fluid motor whose cylinder 308 is fixedly mounted on clamp frame 272. It is believed apparent that reciprocation of piston rod 306 will drive yoke 294 between its clamping and clamp release positions.

Returning to FIG. 14, wedge members 296 are carried upon yoke 294 and are loosely pivotally coupled to the yoke by elongate slots 310 formed in wedge members 296 which loosely receive fixed pins 312 on yoke 294. Yoke 294 is formed with a forwardly projecting flange or platform 312 which underlies the lower surfaces of wedge members 296 to provide a firm surface positively pushing wedge members 296 upwardly as the yoke is elevated. The inner surfaces 316 of wedge members 296 are flat and are adapted to slidably engage the opposed inclined outer surfaces of wedge blocks 298 so that wedge members 296 are pivoted or forced outwardly away from each other as yoke 294 is elevated. To enable wedge members 296 to move between arm members 96 and wedge blocks 298 as the device is moved upwardly from its clamp release position towards the clamping position, inclined surfaces 318 are formed on the outer side of the wedge members. The lower ends of arm members 286 are formed with a smoothly curved lower end portion 320 to accommodate this latter movement.

To provide a positive opening action of the clamp upon lowering movement of yoke 294 from the full line position of FIG. 14, a pair of short lengths of chain 322 are connected between yoke 294 and arm members 296 so that lowering movement of yoke 294 causes the chains 322 to pull downwardly on the outer end portions of arms 286 to swing arms 286 about their pivots 288 from the clamp position to the released position as yoke 294 is retracted.

To assist in retracting the auxiliary clamp assembly clear of the cutter holder for a tool change or for using the headstock indexing drive to shift the auxiliary clamp on ways 52, mechanism is provided to detachably couple clamp assembly 94 to tail-stock 56. This mechanism includes a transversely extending shaft 324 (FIG. 1) mounted for manual rotation in tail-stock 56. A bracket 326 fixedly mounted on clamp 94 has a downwardly facing semi-cylindrical recess 328 of a diameter corresponding to that of shaft 324. Referring to FIG. 16, a slot 330 is formed through that portion of shaft 324 which is aligned with bracket 326 so that when the slot 330 faces upwardly as shown in broken lines in FIG. 16, shaft 324 can be slipped into underlying relationship with recess 328 as the tail-stock is indexed toward the clamp 94. When the shaft 324 is so located in underlying relationship with recess 328, manual rotation of shaft 324 through 180° locates the solid portion of the shaft in seated engagement in recess 328 to mechanically couple clamp 94 to the tail-stock.

CONTROL CIRCUIT AND OPERATION

An exemplary form of electrical control circuit is shown in FIG. 17. This circuit is best described in terms of the operation of the machine.

As an initial condition, it will be assumed that a heavy forged steel crankshaft has been loaded into the chucks of the headstock and tail-stock, that the tool is in its up position, that the auxiliary clamp is opened, and that all of the various relays and solenoids of the electrical control circuit are deenergized.

A cycle is started by depressing the start button of the electrical control circuit to complete a circuit across electrical supply lines L1 and L2 via a start lock-in relay R1. Energization of relay R1 closes its contacts R1a which bypass the start button so that relay R1 remains energized upon subsequent release of the start button.

Since the clamp at this time is open, limit switch contacts LS6a are closed. In the event the headstock locking shot pin and chuck rotation locking wedge are not at this time in their released position, limit switch contacts LS2a and LS4a will be closed and will respectively energize solenoids SO2 and SO4. Solenoid SO2 positions the four-way valve controlling the headstock shot pin operating motor 80 to cause the pin to retract to its released position at which time contacts LS2a will open to deenergize solenoid SO2. Similarly, solenoid SO4 actuates the valve controlling the chuck locking wedge motor 92 to cause this motor to retract the wedge to its release position, at which time contacts LS4a will open to deenergize solenoid SO4.

With the shot pin in its retracted or released position, contacts LS2b will be closed to energize the headstock indexing motor M2 via its numerical positioning system NPC1 and the indexing motor will drive unitl the chucked crankshaft has been shifted axially into alignment with the internal milling cutter. Similarly, when the chuck locking wedge is located in its retracted position, contacts LS4b will be closed to energize the chuck rotary indexing motor M3 via its numerical positioning control system NPC2. The chuck will be rotated until it reaches the desired rotary position locating the pin journal to be machined on the crankshaft in its ready position relative to the internal milling cutter.

When both the headstock locking shot pin and the chuck locking wedge are in their fully released position, limit switch contacts LS2c and LS4c will both be closed to energize a timing relay TR2. Relay TR2 controls a set of delayed closing contacts TR2a which, upon closing, complete a circuit from supply line L1 via contacts LS6a (closed because the clamp is open), contacts TR2a and a reset relay CR to supply line L2.

Relay CR is best described as a reset relay which restores the cam rotation cycle complete limit switch to its normal, unactuated condition. This latter limit switch is employed to discontinue rotation of the cam actuating drive motor M1 after this latter motor has driven one revolution. Because the one revolution detecting relay will normally be in its actuated position at the conclusion of a cycle, reset relay CR is employed to restore the contacts to their normal position.

Closure of contacts TR2a also prepares a circuit for energization of a milling cycle start relay R3 via normally closed clamp close indicating contacts LS5a and contacts NPC1a and contacts NPC2a. These latter contacts are respectively controlled by the numerical positioning control systems controlling operation of the headstock indexing and chuck rotating motors. The NPC contacts are actuated to their closed position when their respective numerical positioning control system shows the crankshaft to be positioned with the pin bearing to be milled located in its ready position relative to the milling cutter. When the crankshaft is so positioned, both contacts NPC1a and NPC2a are closed to energize relay R3. The delayed opening characteristics of contacts TR2a prevent energization of relay R3 until the NPC contacts have opened, by virtue of driving of motors M2 and M3, because the NPC contacts will be closed at the conclusion of milling of one pin and it will be necessary to index the next pin to the ready position before commencing a second milling cycle.

Energization of relay R3 closes its controlled contacts R3a which energize solenoids SO1 and SO3 via normally closed contacts M2a (controlled by indexing motor M2) and normally closed contacts M3a (controlled by chuck rotating motor M3). With neither of these latter motors in operation, both contacts M2a and M3a are closed, thus energizing solenoids SO1 and SO3 upon closure of contacts R3a. Solenoids SO1 and SO3, when energized, operate the valves controlling the shot pin and chuck wedge actuating motors to respectively drive the shot pin and wedge to their locking positions to lock the headstock against displacement and the chuck against rotation. When both the shot pin and chuck locking wedge are in their locking position, contacts LS1a and LS3a are both closed to energize the clamp closing solenoid SO5 which actuates the auxiliary clamp motor to close this latter clamp upon the crankshaft.

Closing of the auxiliary clamp open contacts LS6a and simultaneously opens contacts LS5a. Opening of contacts LS5a opens the circuit to the cycle start relay R3, thus opening contacts R3b. Opening of contacts R3b combined with the opening of contacts LS6a breaks the electrical circuit to solenoids SO2, SO4, M2, M3, TR2, R3, and CR, to isolate all of these solenoids and relays from supply line L1 at this time. Contacts R3a also open upon deenergization of relay R3, however closing of the auxiliary clamp causes contacts LS5b to close, thus maintaining the circuit to solenoids SO1, SO3 and SO5 energized via the revolution complete contacts RCa which are in their normal closed position at this time.

With the clamp closed, and with the shot pin and chuck rotating locking wedge in their locked position, the system is conditioned for a milling operation, this being indicated in the circuit by the closure of contacts LS5c (closed because the clamp is closed), LS1b (closed because the shot pin is seated), and contacts LS3b (closed because the chuck wedge is seated) to the tool down actuating solenoid SO7 via normal closed contacts LS7a which are closed because the tool is not in its down position. Energization of solenoid SO7 actuates the tool raising and lowering motor to lower the tool until it reaches the bottom of its plunge stroke, at which time contacts LS7a open to deenergize solenoids SO7. At this time, the milling cutter teeth 72b have milled the cheeks of the pin supporting cranks during the cutter's plunge stroke and the cutter teeth 72a are in operative milling contact with the top of the pin journal which is to be milled. When the tool 72 reaches its down position, contacts LS7b close to energize the cam drive motor M1 via the normally closed revolution complete contacts RCb.

Cam drive motor M1 remains energized until it has completed one revolution, at which time the milling cutter has completed one orbital path around the pin journal and returned to its tool down position. When the cam drive motor has completed one revolution, contacts RCb open to deenergize cam drive motor. Contacts RCa also open at this time to break the electrical circuit to solenoids SO1, SO3 and SO5 (contacts R3a were previously opened upon closure of the auxiliary clamp with the resultant opening of contacts LS5a to break the circuit to relay R3).

Completion of one revolution of the cam also closes contacts RCc which via normal closed contacts TR2b (closed because relay TR2 is deenergized at this time) and normal closed contacts M1a (closed because cam drive motor M1 is now deenergized) to complete a circuit to solenoid SO8 via normal closed contacts LS8a which are closed because the tool is not at this time in its up position.

Energization of solenoid SO8 causes the tool elevating motor to drive to return the tool 72 to its up position. When the tool arrives at its up position, contacts LS8a open to deenergize solenoid SO8 and contacts LS8b simultaneously close to energize solenoid SO6, thereby opening the auxiliary clamp.

Opening of the auxiliary clamp again closes contacts LS6a to initiate a second indexing cycle as described above to reposition the headstock and chuck to advance the next successive pin on the crankshaft into the ready position previously occupied by the pin milled in the cycle described above. The cycle repeats as described above, energization of reset relay CR opening contacts RCc to disconnect solenoids SO8 and SO6 from line L1 prior to the initiation of a clamp closing and tool lowering operation.

Conversion of the machine from a setup to handle crankshafts of one set of dimensions to a setup for handling crankshafts of a different set of dimensions is relatively simple.

The only change necessary to convert the machine from a four pin crankshaft setup to a six pin crankshaft setup is an appropriate resetting of the numerical positioning control system which controls the rotary chuck indexing motor M3. As described above, the chuck locking cam 88 (FIG. 4) is provided with flat positioning surfaces spaced both at 90° from each other (four four pin crankshafts) and 60° from each other (four six pin crankshafts). Thus, the only adjustment necessary is to set the numerical positioning control system for motor M3 to index 60° per step for the six pin crankshaft as opposed to 90° per step for the four pin crankshaft.

The crank pin throw and pin diameter dimensions are determined by the thickness of gage blocks 248, 260 and 266 and changing the machine setup to new throw and pin diameter settings involves only appropriate replacement of these three gage blocks.

Axial spacing of the pins along the crankshaft requires appropriate location of the headstock shot pin receiving assemblies 82 and appropriate adjustment of the numerical positioning control system for the headstock indexing drive motor M2. Conveniently, a set of shot pin receiving assemblies 82 may be mounted in an elongate block to correspond to each crankshaft, and the block detachably mounted on machine frame 50.

Variations in crankshaft length require appropriate adjustment of tie-rods 62.

It is believed apparent that by suitable selection of gage blocks 248, 260, and 266 that the machine may be set up to mill the main bearing portions of a crankshaft, if desired.

The machine is characterized by its reliability, relative simplicity, maintanence free operation, and its precision. It can be rapidly loaded and unloaded and readily set up to machine crankshafts of varying size and configuration at rapid speeds in the range of 200–500 surface feet per minute. It is faster than known machines and will reduce tooling costs and machine "down" time.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a machine tool having a frame, a set of ways mounted on said frame, an indexable member mounted on said ways for movement thereon between selected positions on said ways, and locking means for locking said member against movement from a selected position on said ways; the improvement wherein said locking means comprises a shot pin mounted on said frame for axial movement along a path normal to said ways between a retracted position and an extended position, said shot pin having a tapered end section, seating means on said member defining a receiving opening tapered complementary to said end section of said shot pin with the axis of said receiving opening extending in a direction parallel to the axis of said shot pin and being adapted to receive said shot pin when said shot pin is moved to its extended position, power means operable when said shot pin and said receiving opening are in an approximate alignment such that said pin can enter said receiving opening for driving said shot pin between its retracted position and its extended position in a seated engagement in said receiving opening wherein said pin and said receiving opening are in precise coaxial alignment with each other, the complementally tapered portions of said pin and receiving opening being operable during movement of said pin to its extended position to shift said member on said ways as required to achieve said coaxial alignment, and movable and lockable positioning means provided on the frame to move in the direction of said axis at an acute angle thereto for shifting the location of the axis of said receiving opening longitudinally of said ways in a direction parallel to the path of movement of said member on said ways.

2. In a machine tool having a frame, a set of ways mounted on said frame, an indexable member mounted on said ways for movement thereon between selected positions on said ways, and locking means for locking said member against movement from a selected position on said ways; the improvement wherein said locking means comprises a shot pin mounted on said member for movement along a path normal to said ways between a retracted position and an extended position, said shot pin having a tapered end section, seating means on said frame defining a receiving opening tapered complementary to said end section of said shot pin with the axis of said opening extending in a direction normal to said ways and being adapted to receive said shot pin when said shot pin is moved to its extended position, means for driving said shot pin between its retracted position and its extended position, positioning means for shifting the location of said receiving opening longitudinally of said ways, said positioning means comprising means defining a passage in said frame inclined relative to the longitudinal extent of said ways, a block received in said passage, said receiving opening being located in said block, and adjusting means for adjusting the depth to which said block projects into said passage.

* * * * *